Oct. 1, 1968    E. S. SIMMONDS    3,404,292

ELECTRONIC TELEGRAPH RELAY INCLUDING SILICON CONTROLLED RECTIFIERS RESPONSIVE TO BINARY INPUT SIGNALS

Filed July 6, 1965    2 Sheets-Sheet 1

Oct. 1, 1968 E. S. SIMMONDS 3,404,292

ELECTRONIC TELEGRAPH RELAY INCLUDING SILICON CONTROLLED RECTIFIERS RESPONSIVE TO BINARY INPUT SIGNALS

Filed July 6, 1965 2 Sheets-Sheet 2

United States Patent Office 3,404,292

Patented Oct. 1, 1968

3,404,292

ELECTRONIC TELEGRAPH RELAY INCLUDING SILICON CONTROLLED RECTIFIERS RESPONSIVE TO BINARY INPUT SIGNALS

Ernest Sydney Simmonds, Bexley, Kent, England, assignor to Telephone Manufacturing Company Limited, London, England, a British company Filed July 6, 1965, Ser. No. 469,480

Claims priority, application Great Britain, Aug. 4, 1964, 31,669/64

5 Claims. (Cl. 307—252)

ABSTRACT OF THE DISCLOSURE

The specification of this application discloses a form of electronic telegraph relay wherein a continuously running oscillator serves as a source of control signals for switching a pair of silicon controlled rectifiers in response to a binary input signal.

The present invention relates to electronic switches and in particular to an electronic switch capable of replacing the conventional polarised electromagnetic relay used in telegraphy to respond to coded signals received over a communication channel.

By the term electronic switch is intended an electroresponsive device having no moving parts which is capable of performing a switching action.

According to the invention there is provided an electronic switching device comprising two silicon controlled rectifiers, means for selectively applying a firing control signal to one of said rectifiers and means responsive to conduction of the rectifier receiving said control signal to pulse the other of said two rectifiers to non-conductive state.

Figure 1:
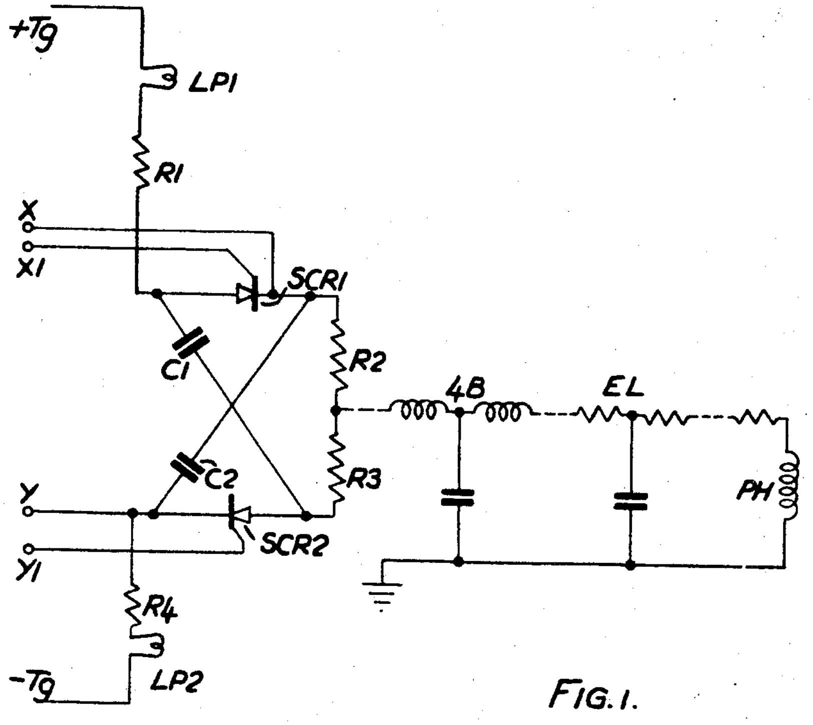
Figure 2:
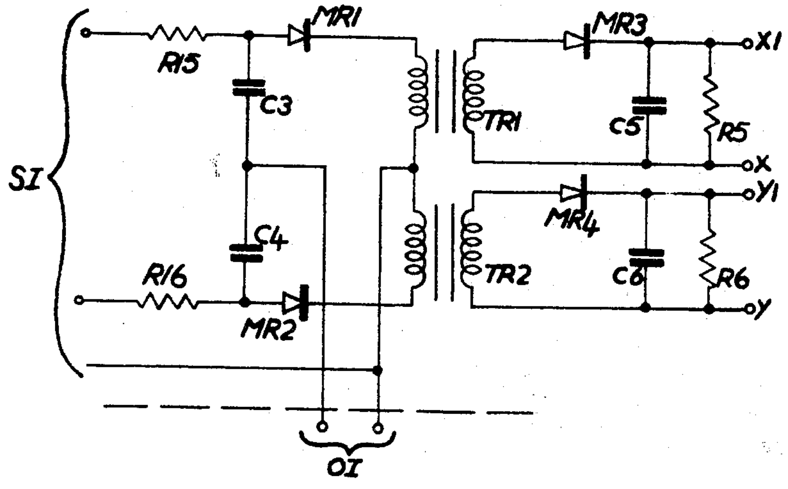
Figure 3:
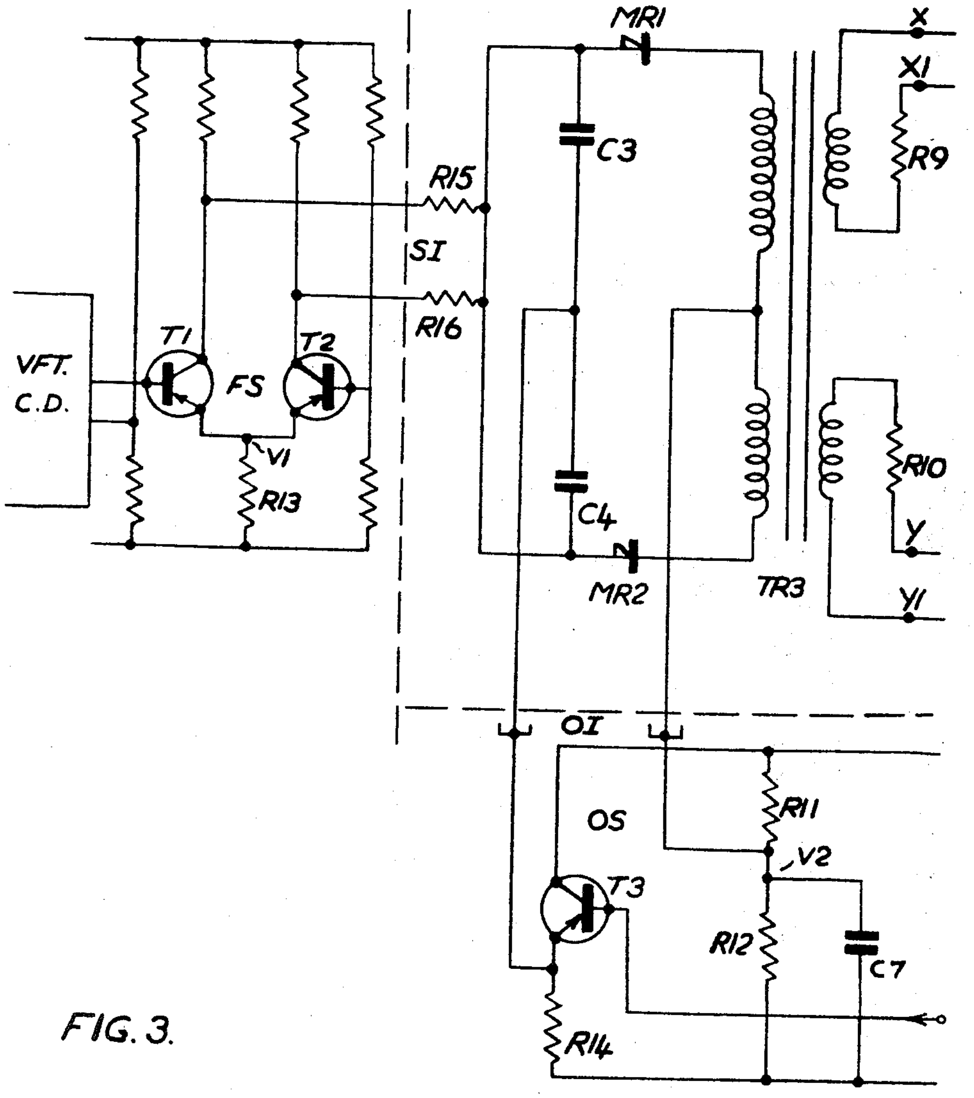

The various features and advantages of the invention will be apparent from the following description taken in conjunction with the accompanying drawings in which:

FIGURE 1 is a circuit diagram of the output switching circuit of an electronic switch incorporating the invention and FIGURES 2 and 3 are circuit diagrams of alternative forms of control circuit for the output switching circuit of FIGURE 1.

Referring to FIGURE 1 there is shown the output section of an electronic switch for energising the magnet coil of a printer. It comprises two silicon controlled rectifiers SCR1 and SCR2 with the anode of each and the cathode of each coupled together by means of a capacitor C1 and C2 respectively. A control input from FIGURE 2 or FIGURE 3 is applied between the cathode and gate or control electrode of each of the rectifiers SCR1 and SCR2 by means of terminals X, $X_1$ and Y, $Y_1$. The junction between two resistors R2 and R3 connected in series between the rectifiers is connected through a filter 4B and an equivalent line network EL to the printer magnet coil PH. Positive battery supply +T*g* is connected through lamp LP1 and resistor R1 to the anode of SCR1 and negative battery supply —T*g* is connected through lamp LP2 and resistor R4 to the cathode of rectifier SCR2.

The operation of this output circuit is as follows. When a suitable positive going control signal is applied to either rectifier SCR1 or SCR2 over terminals X, $X_1$ or Y, $Y_1$ such rectifier is rendered conductive and battery voltage of the appropriate polarity is applied to filter 4B. The change in voltages at the electrodes of the rectifier thus switched on is applied as an extinguishing pulse to the other of the two rectifiers by virtue of the coupling capacitors C1, C2 so that such other rectifier is prevented from conducting until a suitable control signal is applied over terminals X, $X_1$ or Y, $Y_1$ to reverse the position. In this way the extinguishing of a conducting rectifier is not dependent upon the application to the gate or control electrode of a suitable signal but upon the switching to conductive state of the other rectifier.

Referring now to FIGURE 2 it will be seen that this circuit applies a D.C. control signal to the output circuit of FIGURE 1 to effect switching. The terminals X, $X_1$ and Y, $Y_1$ are connected to secondary windings of two transformers TR1 and TR2 through diodes MR3 and MR4 the two windings having smoothing capacitors and resistors C5, R5, and C6, R6 connected across them. The primary windings of transformers TR1 and TR2 are connected in series in a gating circuit which includes diodes MR1 and MR2, capacitors C3 and C4 and resistors R15 and R16. The output of a low impedance oscillator operating for example at 50 kc./s. is applied to terminals O1 which are connected to the junction points between C3 and C4 and between the primary windings of TR1 and TR2, and the output from the final stage of the signal receiving channel is applied to terminals SI.

This latter output renders one of the diodes MR1 and MR2 conductive and biasses off the other so that the oscillator output is gated to flow either through the primary winding of TR1 or that of TR2 in dependence upon the state of the final stage of the receiving channel. In this way a D.C. control voltage of appropriate polarity to strike either rectifier SCR1 or SCR2 is produced at either terminals X, $X_1$ or Y, $Y_1$. This control voltage is maintained due to the continuous energisation of the relevant transformer and rectifying circuit by the oscillator for so long as the final stage of the receiving channel remains in the same state.

Referring now to FIGURE 3, the terminals X, $X_1$ and Y, $Y_1$ are connected, in series with resistors R9 and R10, to two separate secondary windings of a pulse transformer TR3 which has a centre tapped primary winding forming part of a gating circuit of otherwise the same form as that of FIGURE 2. Also shown in this figure is the final stage FS of the signal receiving channel receiving its input from the channel discriminator and an output stage OS of a conventional pulse oscillator operating for example at 50 kc./s. The latter stage comprises a transistor T3 connected in series with a resistor R14 across the supply and having the pulse output of an earlier stage of the oscillator applied to its base electrode. The junction between the emitter of T3 and R14 is connected to the junction between capacitors C3 and C4 in the gating circuit and the centre point of the primary winding of transformer TR3 is connected to a voltage reference point on a resistance chain constituted by resistors R11 and R12 across the supply to transistor T3. A capacitor C7 is connected across resistor R12. The final stage FS of the receiving channel comprises two transistors T1 and T2 having a common emitter resistor R13, the component values in this stage being arranged to be such that the voltage V1 at the junction of the emitters of T1 and T2 and R13 is equal to the reference voltage V2 at the junction of resistors R11 and R12 in the stage OS, and that operating on a 20 v. supply transistors T1 and T2 provide a voltage differential of 10–12 v. between their collectors due to one being conductive when the other is substantially non-conductive. It is this differential which, applied over terminals SI controls the states of the gating diodes MR1 and MR2.

With the arrangements just described the pulse output applied at terminals OI is gated through one or other half of the primary winding of transformer TR3 and induces pulses of opposite polarity in the two secondary windings. In one of these secondary windings positive going pulses are produced of sufficient amplitude to ensure that the rectifier SCR1 or SCR2 to which it is connected is rendered conductive and although the corresponding negative pulses produced in the other secondary winding are applied to the other rectifier these are not relied upon to extinguish such other rectifier.

With either of the control circuits of FIGURES 2 and 3 the electronic switch is immune to variations in conditions in the circuit connected to the junction between R2 and R3 since in one case (FIGURE 2) the control voltage is constantly applied to the conducting rectifier so as to maintain it in conductive state and in the other case (FIGURE 3) pulses of appropriate polarity to ensure switching of the rectifier to conductive state are repeatedly applied to its gate or control electrode so that any tendency to extinguish is corrected at the occurrence of the next control pulse.

I claim:

1. An electronic switching device comprising two silicon controlled rectifiers, a continuously running oscillator, means for deriving from the output of said oscillator a control signal for both said rectifiers, gating means responsive to a binary input signal to selectively apply said control signal to one of said rectifiers, and means responsive to the conductive state of one of said rectifiers to pulse the other rectifier to nonconductive state.

2. A device as claimed in claim 1 wherein said first mentioned means is arranged to derive a continuous D.C. control signal and said gating means is arranged to apply said D.C. control signal to fire one of said rectifiers.

3. A device as claimed in claim 1 wherein said oscillator is a pulse oscillator and said gating means is arranged to apply repeated pulses derived from said oscillator to fire one of said rectifiers.

4. A device as claimed in claim 1 wherein said control signal deriving means is arranged to derive a pulse train from the output of said oscillator consisting of pulses of appropriate polarity and amplitude to fire said controlled rectifiers, and said gating means is arranged to respond to the state of a binary state input signal to selectively apply said pulse train to one of said rectifiers as long as such state persists.

5. A device as claimed in claim 1 wherein said means responsive to the conductive state of one said rectifiers comprises a capacitative coupling between the two rectifiers.

References Cited

UNITED STATES PATENTS 3,334,292 8/1967 King et al. -------- 307—284 X

ARTHUR GAUSS, *Primary Examiner.*

DONALD D. FORRER, *Assistant Examiner.*